Figure 1:
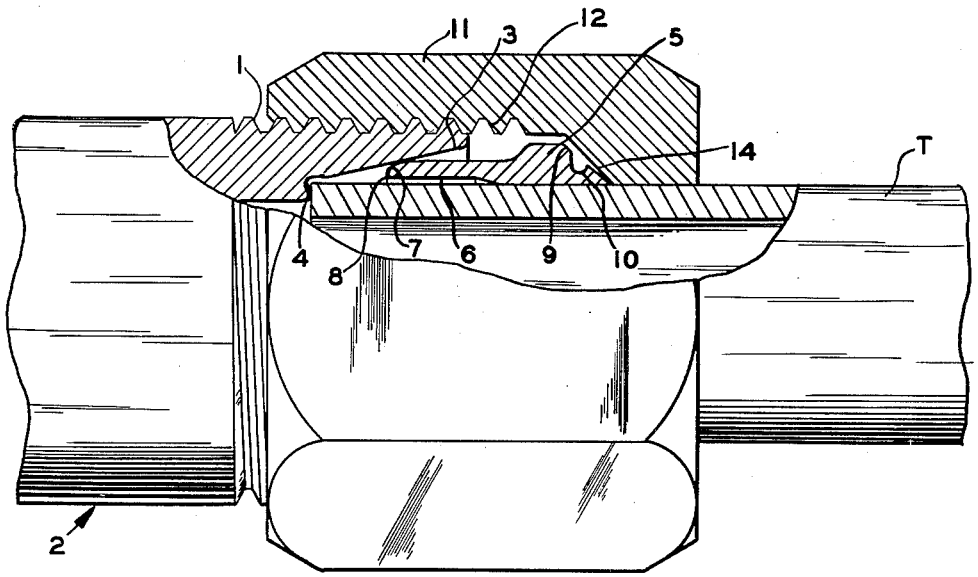

Nov. 7, 1961  L. H. SCHMOHL ET AL  3,007,721
FLARELESS TUBE COUPLING AND FERRULE THEREFOR
Filed Sept. 22, 1958

INVENTORS
LELAND H. SCHMOHL
WILLIAM E. CURRIE &
BY MERRITT E. LANGSTON

Oberlin, Maky, & Donnelly
ATTORNEYS

United States Patent Office 3,007,721
Patented Nov. 7, 1961

3,007,721
FLARELESS TUBE COUPLING AND FERRULE THEREFOR
Leland H. Schmohl and William E. Currie, Cleveland, and Merritt E. Langston, Columbus, Ohio, assignors, by direct and mesne assignments, to Battelle Memorial Institute, Columbus, Ohio, a corporation of Ohio
Filed Sept. 22, 1958, Ser. No. 762,359
1 Claim. (Cl. 285—342)

The present invention relates generally as indicated to a flareless tube coupling and ferrule therefor, and more particularly, to a flareless tube coupling in which the ferrule which surrounds the tube is forced axially along the tube and is radially contracted while engaged with the flare mouth or frusto-conical wedge surface formed in the coupling body, the ferrule having a sharp inner corner which is capable of biting into the surface of the tube and of displacing or "plowing up" the material of the tube to form a holding shoulder thereon.

In flareless tube couplings of that type it is, of course, a primary aim to provide a firm, fluid-tight grip on the tube without perceptible reduction in the inside diameter of the tube. Similarly, it is desired to "plow up" only a minor fractional portion of the wall thickness of the tube so as to leave a major portion for effectively resisting tensile loads. It is known in the flareless tube coupling art to provide couplings operating on the foregoing mentioned principle of biting into the surface of the tube and it is known also to provide, at the outer or rear end of the ferrule, a tube-gripping portion which merely is contracted into frictional gripping engagement with the tube without such biting action, whereby such gripping of the tube at a zone axially outwardly removed from the main gripping and sealing zone serves to support the tube against premature vibration failure at the gripping and sealing zone.

Hitherto, prior inventors of flareless tube couplings of the "bite-in" type have thought it necessary, in order to achieve a proper bite of a ferrule into a tube, to use a ferrule having a sharp end a great deal harder than the tube. A disadvantage of using extremely hard steel ferrules (through hardened) is that the yield strengths thereof are so great as to require excessively high turning torque on the nut of the coupling for contracting such hard ferrules into biting engagement with the tubing with consequent danger of stripping the interengaged threads of the nut and body unless the thread size is increased. The latter expedient, of course, correspondingly increases the size, weight, and cost of the nut and body. On the other hand, while case-hardened ferrules may be hard enough, it has been found that they have poor corrosion resistance in assembled condition. In many industries, it has been found that, while certain stainless alloys (mostly stainless steels) may be used for the tube, the coupling body, and the coupling nut of a flareless tube coupling insofar as corrosion resistance, high temperature resistance, strength, etc. are concerned, the provision of a suitable ferrule which will be readily contracted by moderate torque on the nut, which will "bite" into the tube, and which will retain its corrosion resisting properties in deformed condition has been an unsurmountable obstacle. For instance, while a multitude of steels may be heat-treated to provide sharp edges capable of biting into the selected stainless steel tube, it has been found that such steels do not meet the requirements for corrosion resistance and thus will result in coupling failure when the fluid in the fluid system comes into contact with the end of the ferrule at which the tube is gripped and sealed.

Similarly, most materials which are hard enough to bite (according to pre-existing theory) into the tube have yield strengths so great as to require turning torque on the nut which is apt to strip the threads unless the nut and coupling body threads are substantially enlarged. Another important factor which results in the discarding of numerous hard, corrosion-resisting alloys is the difficulty of machining the same.

With the foregoing in mind, it is a primary object of this invention to provide a flareless tube coupling and ferrule therefor, which is characterized in that all of the coupling components have the required chemical and physical properties, the ferrule, in particular, being so constructed of a select class of stainless alloys to render the ferrule capable of biting into the corrosion-resisting tubing upon application of only a moderate torque on the coupling nut.

It is another object of this invention to provide a ferrule for use with stainless alloy tubing which is made of a stainless alloy, has the necessary corrosion resistance, and which is specially heat-treated to impart thereto a relatively low yield strength for torque reduction while yet the biting edge is capable of "plowing up" a holding shoulder or ridge of prerequisite depth into the surface of the tube.

It is another object of this invention to provide a flareless tube coupling and ferrule therefor characterized in that there is seizing or galling at the ferrule and tube interface which materially contributes to secure the tube against pulling out of the coupling and to reduce shear stress at the "plowed up" ridge or shoulder of the tube.

It is another object of this invention to provide a flareless tube coupling and ferrule therefor which is characterized by a high coefficient of friction between the tube and the sharp edge of the ferrule such that galling occurs between the ferrule and the tube, which tends to cause the sharp edge of the ferrule to "toe in" and thereby bite into the tube. Contrary to this, case-hardened ferrules, aside from poor corrosion resisting properties, tend to slide along the tube surface. Thus, the galling characteristic herein contributes to reduction in the hardness differential between the ferrule and the tube while yet achieving a good bite of the ferrule on the tube.

It is yet another object of this invention to provide a flareless tube coupling and ferrule therefor in which the ferrule is characterized by its phenomenal work-hardening property so that it will effectively bite into the tube even though its biting end initially may be only slightly harder than the tube, or in fact, may be softer than the tube.

It is still another object of this invention to provide a flareless tube coupling in which the ferrule, not only has phenomenal work-hardening characteristics as aforesaid, but has a substantial initial radial clearance about the tube so that the work-hardening progresses at moderate torque without the tube itself offering any resistance to deformation of the ferrule until after the biting edge of the ferrule comes into contact with the tube.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
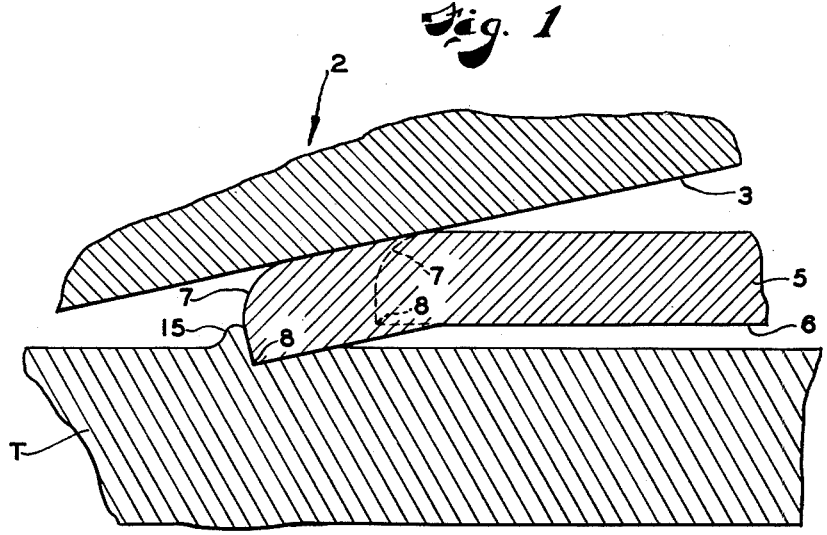

In said annexed drawing:

FIG. 1 is a fragmentary elevation view, partly in section, showing a flareless tube coupling according to the present invention, the coupling nut being shown in finger-tight condition; and FIG. 2 is a much enlarged fragmentary cross-section view showing how the sharp inner corner of the ferrule bites into the tube to "plow up" a holding ridge or shoulder when the coupling nut is tightened with a wrench.

Referring first to FIG. 1, the reference numeral 1 designates the externally threaded port of the coupling body 2 which optionally may be an elbow, a T, a union, or the like. The port 1 defines a tube receiving cavity including the frusto-conical surface 3 of about 12° taper which terminates in a shoulder 4 against which the end of a tube T to be coupled is adapted to be positioned. Slipped onto the end of the tube T is a ferrule 5 which herein is shown as being counter-bored at 6 so as to initially clear the exterior surface of the tube by a substantially amount such as .010" for ½" tubing. That end of the ferrule 5 is formed with a well-rounded outer corner 7 and a sharp inner corner 8. The thicker rear portion of the ferrule 5 is beveled as at 9 and is formed with a peripheral groove 10 to facilitate radial contraction of the rear end of the ferrule 5 into vibration resistant engagement with the tube T.

The coupling nut 11 is more or less of conventional form formed with internal threads 12 for threaded engagement with the port 1 of the coupling body 2 and with an internal flange or beveled shoulder 14 which engages the rear beveled end 9 of the ferrule 5. The angle of the beveled inner face of shoulder 14 is preferably greater than the angle of the beveled end 9 of the ferrule 5 so that as the nut 11 is tightened on the body 2, the rear end portion adjacent groove 10 will be contracted into engagement with the tube T. By way of example, the beveled end 9 may have a taper of 40°, whereas the shoulder of the nut may have a taper of say, 45°.

As is evident, when the nut 11 is tightened, as with a wrench or the like, the ferrule 5 will be forced axially along the tube T whereby the rounded external corner 7 thereof will confront the flare mouth 3 of the body 2. Such wedging action will cause the front end of the ferrule to be progressively contracted first to close up the radial clearance between counterbore 6 and the exterior surface of tube T and then into engagement with the tube T. In FIG. 2, the dotted lines represent the initial position of the ferrule 5 with its rounded exterior corner 7 engaged with the flare mouth 3 of the body 2. Now, as the ferrule 5 is axially advanced toward the left as viewed in FIG. 2, the front end thereof is deformed radially inward, the sharp inner corner 8 moving inwardly toward and into engagement with the tube T. As hereinafter explained in detail, certain critical features of the ferrule 5 result in the progressive biting in of the sharp corner 8 to displace the metal of the tube T so as to form a substantial holding shoulder or ridge 15 with only a penetration of about 2½–3 mils and with only moderate torque exerted on the nut 11.

From the foregoing it can be seen, therefore, that one of the requirements of the ferrule 5 is that it have a sharp corner 8 and that such sharp corner be capable of biting into the tube T wall as shown in FIG. 2. It has been found preferred to make the included angle of the sharp corner about 90° to, in effect, provide a zero or negative rake angle rather than a cutting edge with positive rake. In flareless tube couplings of this type, better results are obtained by displacing the tube metal than by slicing or cutting action.

As beforementioned, one of the problems encountered with a corrosion-resisting flareless tube coupling for stainless alloy tubing is the provision of a ferrule that has not only the required corrosion resistance, but also the proper functional characteristics or physical properties for securely gripping the tube by biting thereinto. While there are a number of stainless alloys that have the required corrosion resistance, they do not possess the necessary physical properties for biting into the stainless alloy tube. On the other hand, if the selected alloy has the biting property then its corrosion resisting properties are either inadequate or are adversely affected by deformation, or the yield point of the metal is so great as to require excessive wrench pressures.

It has been found also that superior holding power on the tube may be achieved when the ferrule 5 is made of a material that seizes or galls on the tube T as a consequence of the axial advance and radial contraction of the ferrule.

For use with annealed or ¼-hard A.I.S.I. type 304 and 316 stainless steel tubing, for example, it has been found that ferrules 5 of stainless alloys containing from about 14 to 24% chromium and specially heat-treated are the only ones which will operate satisfactorily with respect to corrosion resistance, bite, moderate yield strength, machinability, etc. Following is a table of the compositions for a few stainless alloys which have been found suitable for use as ferrules 5 for coupling stainless steel tubes T.

| Stainless Steel | Chemical Composition (percent by weight) | | | | | | |
|---|---|---|---|---|---|---|---|
| | C | Mn | Cr | Ni | Mo | Cb.Ta | Cu |
| A | 0.10 | 0.40–0.60 | 16.25–17.25 | 4.0–4.5 | 2.5–3.5 | | |
| B | 0.17 | | 14.5–16.0 | 4.0–4.5 | 2.5–3.0 | | |
| C | 0.07 | 1.0 | 15.5–17.5 | 3.0–5.0 | | 0.25–0.45 | 3.0–5.0 |
| | | | | | | N$_2$ | |
| D | 0.15 | 7.5–10.0 | 17.0–19.0 | 4.0–6.0 | | 0.25 | |
| | | | | | | Si | N$_2$ |
| E | 0.45–0.60 | 7.0–10.0 | 20.0–23.0 | 3.0–5.0 | | 1.0 max. | 0.30–0.50 |
| F | 0.08 | 1.0 | 18.0–20.0 | 8.0–11.0 | | 1.0 | |
| G | 0.10 | 2.0 | 16.0–18.0 | 10.0–14.0 | 2.0–3.0 | 1.5 | |

| | C | Mn | Cr | Ni | Mo | Si | Cu | Cb | Fe |
|---|---|---|---|---|---|---|---|---|---|
| High Temp. Alloy: H | 0.40 | 0.6 | 20.0 | 20.0 | 4.0 | 0.6 | 44.0 | 4.0 | 4.0 |
| | | | | | | | | Ti | Al |
| Nickel Alloy: I | 0.40 | 0.70 | 15.0 | 73.0 | | 0.30 | 2.5 | 0.9 | 7.0 |

In general, stainless steels may be classified as class I with chromium from 12 to 17% as the sole major alloy addition and carbon is the next most important addition; class II with chromium from 18 to 30% is the sole major alloy addition; and class III with chromium from about 8 to 30% and nickel from about 6 to 20% as major alloy additions with carbon held low.

The principal characteristic of class I stainless steel is the ability to harden the same by heat treatment that produces martensite. Class I stainless steels are popularly referred to as "martensitic" or "hardening" or "straight chromium" stainless steels.

In the class II stainless steels limited contents of carbon and other minor alloy additions provide no appreciable martensite, the microstructure being predominately ferrite. One of the principal characteristics of class II stainless steels is a surprising corrosion resistance of class II stainless steels is a surpassing corrosion resistance but class II steels have an inability to harden by martensite formation. Popular terms are "ferritic," or "non-hardening" stainless steels.

With the class III stainless steels the carbon content is held low, with other elements added with respect to balance of the austenite phase now made stable by the presence of nickel. The principal characteristics of the class III stainless steels are the ductile austenitic condition, the work-hardening which rapidly develops during cold working, and a superlative corrosion resistance. These stainless steels are often referred to as "austenitic" or "chromium-nickel" or "work-hardening" or "18–8" stainless steels.

The phenomenon of superior normal corrosion resistance occurring at ordinary temperatures is called "passivity" because of the inertness or passiveness evidenced by the steel and this is the primary accomplishment of the stainless steels.

"Sensitization" which is the harmful precipitation of a grain boundary constituent in a certain temperature range of low red heat is a characteristic of the austenitic class III steels. Certain of the austenitic class III steels may disintegrate by granulation during the first few hours of exposure to corrosive solutions.

One means for combating sensitization is to hold the steel at above the top of the sensitization range which causes the preexisting chromium carbides to disassociate and redissolve into the matrix. Experience indicates that annealing above 1000° C. (1830° F.) and preferably in the range of 1050 to 1100° C. (1900 to 2000° F.), will cause the boundary carbides to dissolve. Rapid cooling through the sensitizing range, as by quenching, will then preclude their reforming.

A second way for combating sensitization is to deliberately precipitate the carbides but in a condition which is not particularly injurious to corrosion resistance. This may be accomplished in three steps:

(1) Dissolve the carbide in a heat-treatment above 1000° C. (1830° F.);

(2) Cold work the steel from 15 to 50% to open up slip planes within the grain; and (3) Heat within the sensitizing range whereby the carbide precipitates as a dispersion within the grain rather than the grain boundary.

A third way is to reduce the carbon content to a value where it is ineffective to remove chromium from the grain.

A fourth means for preventing sensitization is to continue the damaging heat treatment sufficiently long to allow chromium from the body of the grain to diffuse into the chromium impoverished envelope and replenish it. Such treatment is expedited by cold working before the annealing heat treating.

A fifth method is to balance the composition so as to provide a microstructure preferably containing from 10 to 20% ferrite. In that case the chromium preferentially enriches in the ferrite constituent which preferentially forms at the grain boundaries of the austenite. As a consequence dangerous heat treatments produce sensitization in very early periods of an hour or so, but the effect rapidly disappears with longer times at heat treating temperatures. Thereafter the steel is immune from intergranular corrosion.

A sixth method is to add to the steel an alloying element which has greater affinity for the carbon than does chromium and which, therefore, expropriates any available carbon for its own carbide, leaving the chromium free for its operation of passivation. Among such alloy elements are titanium, columbium, and tantalum.

With reference to physical properties, class I martensitic steels have a yield strength which is on the order of 50 to 60% of the ultimate tensile strength and for high carbon alloys the yield strength and tensile strength are nearly equal.

The class II ferritic steels are relatively weak steels which have yield strengths comparable with those of mild steel and are inherently soft. Annealing is the only useful heat treatment, principally for relieving cold working strains.

The class III austenitic stainless steels have a distinction of providing an exceedingly wide range of mechanical properties even without being responsive to thermal hardening. This unique situation develops from the phenomenon of work-hardening as representing a type of martensite reaction induced by plastic deformation at ordinary temperatures. In the annealed condition class III alloys have excellent ductility comparing with the best of steels in deep drawing properties or capability to withstand plastic deformation. The hardness which is less than 200 Brinell for annealed austenitic steels increases with cold work approaching values of 500 Brinell, particularly when special precipitation hardening analyses are used.

As to heat treatment of class III stainless steels, annealing is the principal form of heat treatment, putting them in a condition of maximum ductility by removing prior cold working strains and by dissolving into the austenite, the carbides and other secondary phases within the microstructure. Annealing temperatures near 1000° to 1100° C. (1800° to 2000° F.) are commonly used, higher annealing temperatures giving lower hardness by dissolving more of the free carbides. The austenitic class III steels are annealed by quenching from the temperature of the heat treatment. All the stainless steels harden and strengthen to some extent during cold deformation, however, with the class III stainless steels work-hardening is phenomenal.

In discussing the heat treatment of stainless steels three temperature ranges are commonly used, namely, (1) 300 to 650° C. for stress relieving of class I, II, and III and for tempering of class I.

(2) 650 to 850° C. for preheating classes I, II and III, and (3) 850 to 1150° C. for hardening class I and for annealing class III.

As aforesaid, the stainless steels having an austenitic structure work-harden very rapidly, that is, a small amount of cold work produces a disproportionate increase in hardness. Thus, when a cutting tool plows off a chip it necessarily smears and work-hardens the machine surface. Moreover, the austenitic steels that are listed in the table above are tough and also have high frictional characteristics. The high chromium stainless steels seem to possess frictional properties to an unusual degree. The high frictional characteristics are of importance here in that seizing or galling of the ferrule 5 on the tube T is promoted.

It has been found that, while hardness is a factor in influencing the bite behaviour of the short edge 8 of the ferrule 5, a wide difference in hardness of the ferrule 5 with respect to the tube T is not required in order to produce a satisfactory bite. By using ferrules made from alloys A to E, adequate bite may be produced at hardness levels only slightly greater than that of the alloy F or G tubing (A.I.S.I. types 304 and 316, respectively), and, in fact, with the alloy D, the ferrule hardness may be less than that of the tubing and yet produce a satisfactory bite.

A desirable characteristic of the biting end of the ferrule 5 is high friction, preferably sufficient to cause seizing or galling, this having been mentioned heretofore. In general, the ferrule 5 should have a sharp biting edge 8 of sufficient hardness to penetrate the tubing surface as it is progressively advanced axially and contracted radially with respect to the tube. The ferrule 5 must deform the metal of the tubing, and to preclude the necessity of applying high torque load on the nut 11 which is apt to strip the threads, a reduction in yield strength effects a corresponding reduction in torque load.

The mechanical properties of the alloys A to I are given in the following table:

| Alloy | Mechanical Properties | | | | | |
|---|---|---|---|---|---|---|
| | Annealed | | | Hardened | | |
| | Hardness (Rockwell) | Yield Strength, 1,000 p.s.i. | Tensile Strength, 1,000 p.s.i. | Hardness (Rockwell) | Yield Strength, 1,000 p.s.i. | Tensile Strength, 1,000 p.s.i. |
| A | B94 | 45–52 | 156–186 | (Aged) C40. | 110 | 200 |
| B | | | | | | |
| C | C37 | 110 | 150 | C40–43 (Full hard). | 165–180 | 180–195 |
| D | | 35 | 100 | | 150 | 185 |
| E | | | | (aged) C37. | 102 | 162 |
| F | B75–90 | 35–45 | 85–105 | (Full hard) C35. | 161 | 181 |
| G | B75–92 | 30–40 | 85–100 | (Full hard) C38. | 150 | 170 |
| H | B93–C37 | 110 | 150 | (aged) C43. | 180 | 195 |
| I | C21 | 50 | 115 | C34–42 | 120 | 180 |

Test results using ferrules 5 of alloys A to E on ¼-hard tube T of alloy F of about Rockwell C28 hardness reveal that all around satisfactory results as to corrosion resistance and depth of tube bite by the ferrule at moderate torque load on nut 11 are obtained with alloy A having hardnesses of from about Rockwell C29 to 43 resulting from different treatments ranging from annealed at 1740° F.; subzero cooled 2 hours at −110° F., 8 hours at −110° F.; and subzero cooled 2 hours and 8 hours at −110° F. and tempering for 1 hour at 850° F. Similarly, alloy B ferrules are satisfactory in all respects when of hardness ranging from about Rockwell C36 to 43 and in annealed condition at 1740° F. and when subzero cooled for 2 hours and 8 hours at −110° F. Alloy C ferrules should be aged and the hardness ought to be, say about Rockwell C44. Alloy D ferrules of Rockwell C25.5 hardness have proved to be satisfactory despite the initial softness as compared with the tube, this evidently being attributable to the phenomenal work-hardening characteristics and perhaps to some degree to high frictional characteristics. Moreover, with alloy D the torque required for a good bite was about ⅓ less than some of the initially harder alloys. Alloy E ferrules have proved satisfactory in both as hot rolled and machined and as aged 16 hours at 1400° F., the hardness being about Rockwell C42–44. Alloy H ferrules of C30 to 32 hardness operate well also in an annealed, cold-worked condition and aged say 16 hours at 1400° F. Finally, alloy I ferrule are satisfactory when of hardness of about C35 as obtained by aging for 20 hours at 1300° F.

From the foregoing, it can be summarized that one criterion in the choice of a proper ferrule material for a flareless tube coupling for corrosion resistance, for a good bite into stainless steel tubing of alloy F or G, for moderate torque on nut 11, for ease of machining, for reasonable cost is the design of the ferrule 5 itself with a sharp corner 8 and of the coupling body 2 and nut 11. Thus, the initial clearance enables initiation of work-hardening of the ferrule 5 without resistance from the tube T and with alloys having pronounced work-hardening properties a ferrule softer or only slightly harder than the tube T may be used, while lower torques on nut 11 are required. Another criterion is that ferrule alloys with high frictional characteristics lead to seizing or galling of the ferrule 5 on the tube T, thereby further contributing to the obtaining of a secure grip on the tube T. The ferrule alloys A–E and H and I have the required properties when heat-treated as generally indicated above and when made into ferrules 5 designed to grip a tube T by "biting" thereinto and by displacing the tube metal to form a holding shoulder or ridge 15.

A significant feature of this invention (see "Mechanical Properties," Alloy A, for example), is that certain alloys can be heat treated to provide a ferrule of relatively high hardness in comparison with its yield strength. Alloy A has a hardness of Rockwell C40 but its yield strength is only about 110,000 p.s.i. in comparison with a tensile strength of about 200,000 p.s.i. when heat treated, without tempering, by annealing at 1650° F. for at least one hour, rapidly cooling through the sensitization range or to room temperature, and subzero cooling until transformation from austenite to martensite has occurred. Alloy steels such as S.A.E. 3240 and S.A.E. 4340 when heat treated to that hardness, that is about Rockwell C40 (Brinell No. 400) have yield points of nearly 200,000 p.s.i. and tensile strengths up to about 210 to 220,000 p.s.i.

Other modes of applying the principle of the invention may be employed, change being made as regards the details described, provided the features stated in any of the following claim, or the equivalent of such, be employed.

We therefore particularly point out and distinctly claim as our invention:

A flareless tube coupling assembly comprising a length of tube; a body formed with a tapered bore surrounding an end portion of said tube; a ferrule surrounding said tube and having one end confronting said bore; and a nut in threaded engagement with said body and operative to axially advance said ferrule relative to said body and thereby radially contract said one end of said ferrule into gripping engagement with said tube; said ferrule having a sharp inner corner at said one end and being characterized in that it comprises austenitic stainless steel which, prior to such advancement and radial contraction, is in annealed condition when positioned around said tube between said body and nut; said ferrule having been subjected to annealing for at least one hour, to rapid cooling through the sensitization range, and to sub-zero temperature for transformation of austenite to martensite; said ferrule having a yield strength of about one-third of its tensile strength, having, in its aforesaid annealed condition, a hardness less than that of said tube, and having marked work-hardening properties whereby a small amount of deformation thereof produces a disproportionate increase in hardness thereof; said ferrule, upon tightening of said nut, being axially advanced and radially contracted as aforesaid by moderate torque on said nut and being work-hardened by such deformation whereby said sharp inner corner bites into the surface of said tube.

References Cited in the file of this patent

UNITED STATES PATENTS 2,179,127    Lauer                Nov. 7, 1939

(Other references on following page)

UNITED STATES PATENTS

| | | |
|---|---|---|
| 2,197,365 | Kjerrman | Apr. 16, 1940 |
| 2,211,856 | Kreidel | Aug. 20, 1940 |
| 2,414,184 | Wurzburger | Jan. 14, 1947 |
| 2,472,872 | Woodling | June 14, 1949 |
| 2,474,178 | Wurzburger | June 21, 1949 |
| 2,624,688 | Svenson | Jan. 6, 1953 |

FOREIGN PATENTS

| | | |
|---|---|---|
| 915,008 | France | July 8, 1946 |

OTHER REFERENCES

Stainless Steel by Carl A. Zaffee, of 1949, the American Society of Metals, Cleveland, Ohio. (In Div. 3.)

Imperial Brass Manufacturing Co., Bulletin No. 3061–b (copyright 1956) (28 pages).

UNITED STATES PATENT OFFICE
CERTIFICATION OF CORRECTION

Patent No. 3,007,721                                  November 7, 1961

Leland H. Schmohl et al.

It is hereby certified that error appears in the above numbered patent requiring correction and that the said Letters Patent should read as corrected below.

In the grant, lines 3 and 4, for "assignors, by direct and mesne assignments, to Battelle Memorial Institute, of Columbus, Ohio, a corporation of Ohio," read -- assignors, by direct and mesne assignments, to Parker-Hannifin Corporation, of Cleveland, Ohio, a corporation of Ohio, --; line 13, for "Battelle Memorial Institute, its successors" read -- Parker-Hannifin Corporation, its successors --; in the heading to the printed specification, lines 5 to 7, for "assignors, by direct and mesne assignments, to Battelle Memorial Institute, Columbus, Ohio, a corporation of Ohio" read -- assignors, by direct and mesne assignments, to Parker-Hannifin Corporation, Cleveland Ohio, a corporation of Ohio --.

Signed and sealed this 17th day of April 1962.

(SEAL)
Attest:

ESTON G. JOHNSON
Attesting Officer

DAVID L. LADD
Commissioner of Patents